(12) United States Patent
Abdelmoneum et al.

(10) Patent No.: US 9,702,769 B2
(45) Date of Patent: Jul. 11, 2017

(54) SELF-CALIBRATED THERMAL SENSORS OF AN INTEGRATED CIRCUIT DIE

(71) Applicant: Intel Corporation, Santa Clara, CA (US)

(72) Inventors: Mohamed A. Abdelmoneum, Portland, OR (US); David E. Duarte, Portland, OR (US); Gregory F. Taylor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 680 days.

(21) Appl. No.: 13/915,453

(22) Filed: Jun. 11, 2013

(65) Prior Publication Data

US 2014/0365156 A1    Dec. 11, 2014

(51) Int. Cl.
*G06K 15/00* (2006.01)
*G06K 11/00* (2006.01)
(Continued)

(52) U.S. Cl.
CPC ............ *G01K 15/005* (2013.01); *G01K 7/32* (2013.01)

(58) Field of Classification Search
CPC .... G01K 15/005; G01K 7/32; G05D 23/1928; H03H 3/0076; H03H 9/02448
(Continued)

(56) References Cited

U.S. PATENT DOCUMENTS 7,211,926 B2    5/2007   Quevy et al.
7,671,710 B2    3/2010   Yoshida et al.
(Continued)

FOREIGN PATENT DOCUMENTS

CN    101346879 A    1/2009
CN    102167279 A    8/2011
(Continued)

OTHER PUBLICATIONS

TW Office Action for TW Application No. 103117901, dated Jun. 11, 2015, 19 pages.
(Continued)

*Primary Examiner* — John H Le
(74) *Attorney, Agent, or Firm* — Schwabe, Williamson & Wyatt, P.C.

(57) ABSTRACT

Embodiments of the present disclosure provide self-calibrated thermal sensors of an integrated circuit (IC) die and associated techniques and configurations. In one embodiment, a self-calibrating thermal sensing device includes a resonator configured to oscillate at a frequency corresponding with a temperature of circuitry of an integrated circuit (IC) die, wherein the resonator is thermally coupled with the circuitry and configured to operate in a first mode and a second mode and logic operatively coupled with the resonator, and configured to calculate a first temperature corresponding with a first frequency of the resonator in the first mode using a first equation, calculate a second temperature corresponding with a second frequency of the resonator in the second mode using a second equation, and add an offset to the first equation and the second equation based on a result of a comparison of the first temperature and the second temperature. Other embodiments may be described and/or claimed.

20 Claims, 4 Drawing Sheets

(51) Int. Cl.
*G01K 15/00* (2006.01)
*G01K 7/32* (2006.01)

(58) Field of Classification Search
USPC ...... 702/99, 130, 132, 117, 118; 331/66, 70, 331/176; 334/6; 374/117, 126; 310/315
See application file for complete search history.

(56) References Cited

U.S. PATENT DOCUMENTS

| | | | |
|---|---|---|---|
| 8,827,550 B2* | 9/2014 | Abdelmoneum | ........ G01K 7/32 374/117 |
| 2005/0285692 A1 | 12/2005 | Mattila et al. | |
| 2012/0265037 A1 | 10/2012 | Bohm et al. | |
| 2012/0268216 A1* | 10/2012 | Borremans | ........ G05D 23/1928 331/70 |

FOREIGN PATENT DOCUMENTS

| | | |
|---|---|---|
| CN | 202442811 U | 9/2012 |
| TW | 201130255 A | 9/2011 |

OTHER PUBLICATIONS

International Preliminary Report on Patentability mailed Dec. 23, 2015, issued in corresponding International Application No. PCT/US2014/041157, 10 pages.

Korean Office Action mailed Sep. 13, 2016, issued in corresponding Korean Patent Appln. No. 2015-7032166.

The Extended European Search Report mailed Jan. 18, 2017, issued in related European Application No. EP 14 81 0470, 8 pages.

Koskenvuori M. et al., "Temperature Measurement and Compensation Based on Two Vibrating Modes of a Bulk Acoustic Mode Microresonator," IEEE 21st International Conference on MEMS, MEMS 2008, Tucson, AZ, USA, Jan. 13-17, 2008, pp. 78-81.

Stofanik, V., et al.,"Self-Identiflcation of Differences between Aging Rates of Two Frequencies Excited in the Dual-Mode Crystal Oscillator," EFTF-2010 24th European Frequency and Time Forum\, (2010), pp. 1-6, DOI: 10.1109/EFTF. 2010.6533675.

* cited by examiner

SELF-CALIBRATED THERMAL SENSORS OF AN INTEGRATED CIRCUIT DIE

FIELD

Embodiments of the present disclosure generally relate to the field of integrated circuits, and more particularly, to self-calibrated thermal sensors of an integrated circuit (IC) die.

BACKGROUND

Emerging thermal sensors may be integrated with circuitry (e.g., CMOS device) of a die. However, process variations in deep submicron manufacturing of the thermal sensors may induce significant inaccuracies in such sensors. To resolve this problem, the thermal sensors may be calibrated during assembly testing (e.g., class or test). For example, the die may be placed on a thermal chuck with temperature control and the thermal sensors may be calibrated to read various temperatures of the thermal chuck. Such calibration technique may provide thermal sensors that are inaccurate (e.g., discrepancy of about +/-3-5 degrees Celsius at intermediate temperatures of a hot-to-cold range), which may result in lost performance opportunity, lost energy in cooling and/or other associated problems with power control. Further, accuracy of thermal sensors may diminish over time due to age-induced effects. Current thermal sensors may not be equipped for calibration in the field (e.g., in a final product of an electronic computing device in the hands of a user), which may further exacerbate lost performance opportunity, lost energy in cooling and/or other power control problems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
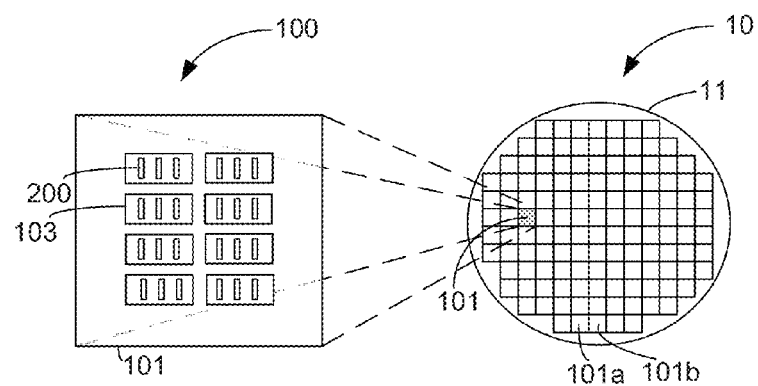
FIG. 1 schematically illustrates an example top view of an integrated circuit (IC) die in wafer form and in singulated form, the IC die including one or more self-calibrating thermal sensors, in accordance with some embodiments.

Embodiments of the present disclosure include self-calibrated thermal sensors of an integrated circuit (IC) die and associated techniques and configurations. In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first feature formed, deposited, or otherwise disposed on a second feature," may mean that the first feature is formed, deposited, or disposed over the second feature, and at least a part of the first feature may be in direct contact (e.g., direct physical and/or electrical contact) or indirect contact (e.g., having one or more other features between the first feature and the second feature) with at least a part of the second feature.

As used herein, the term "module" or "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 schematically illustrates an example top view of an integrated circuit (IC) die (hereinafter "die 101") in wafer form 10 and in singulated form 100, the die 101 including one or more self-calibrating thermal sensors (hereinafter "self-calibrating thermal sensor 200"), in accordance with some embodiments. In some embodiments, the die 101 may be one of a plurality of dies (e.g., dies 101, 101a, 101b) of a wafer 11. The wafer 11 may include a semiconductor substrate composed of a semiconductor material such as, for example, silicon (Si) or other suitable semiconductor material. Individual dies may include circuitry 103 formed on a surface of the wafer 11. The circuitry 103 may include, for example, one or more integrated circuit (IC) devices such as, for example, transistors formed on an active side of the die 101 and/or interconnect circuitry that electrically couples the IC devices with other electronic devices external to the die 101. Each of the dies (e.g., dies 101, 101a, 101b) may be a repeating unit of a semiconductor product that includes a self-calibrating thermal sensor 200, as described herein. The dies may comport with embodiments described, for example, in connection with FIGS. 2-3. The self-calibrating thermal sensor 200 may be embedded within the circuitry 103 in some embodiments.

After a fabrication process of the semiconductor product is complete, the wafer 11 may undergo a singulation process in which each of the dies (e.g., die 101, 101a, 101b) is separated from one another to provide discrete "chips" of the semiconductor product (e.g., die 101 in singulated form 100). The wafer 11 may be any of a variety of sizes. In some embodiments, the wafer 11 has a diameter ranging from about 25.4 mm to about 450 mm. The wafer 11 may include other sizes and/or other shapes in other embodiments. According to various embodiments, the self-calibrating thermal sensor described herein may be part of a die 101 in wafer form 10 or singulated form 100 depending on whether the wafer 11 has been singulated or not. The die 101 may be configured to perform any of a wide variety of suitable functions. For example, the die 101 may represent or include a processor, memory or ASIC, or combinations thereof. In one embodiment, the die 101 represents or includes a Central Processing Unit (CPU).

The depictions of the circuitry 103 and the self-calibrating thermal sensor 200 are provided only as an example for the sake of discussion. The circuitry 103 and self-calibrating thermal sensor 200 are not limited to the depicted configuration and may include a wide variety of suitable configurations according to various embodiments.

Figure 2:
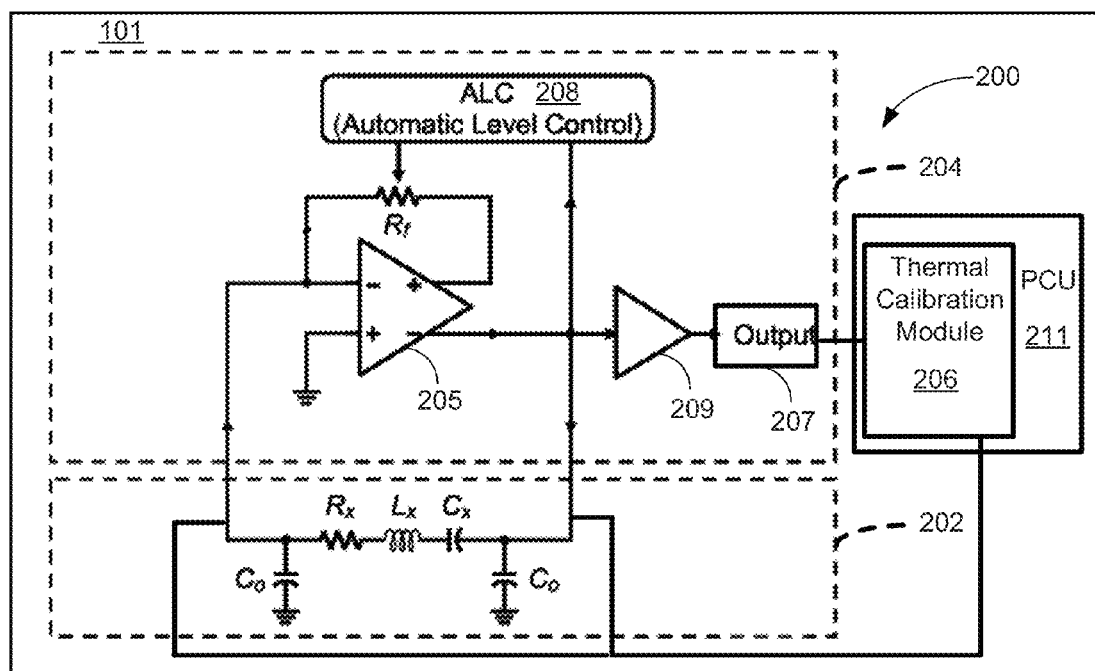
FIG. 2 schematically illustrates an example configuration of a self-calibrating thermal sensor, in accordance with some embodiments.

FIG. 2 schematically illustrates an example configuration of a self-calibrating thermal sensor 200, in accordance with some embodiments. In some embodiments, the self-calibrating thermal sensor 200 may include circuitry of a Micro Electro Mechanical System (MEMS) resonator that may include an oscillator circuit formed on a die 101 (e.g., only a portion of the die 101 may be shown in FIG. 2) or off die. For example, the self-calibrating thermal sensor 200 may include a MEMS resonator that has an equivalent circuit (hereinafter "resonator circuitry 202") coupled with feedback circuitry 204 and a thermal calibration module 206 coupled with the feedback circuitry 204 and/or the resonator circuitry 202, as can be seen.

The resonator circuitry 202 may include, for example, a resistor Rx, inductor $L_x$ and capacitor $C_x$ coupled with each other in series, as can be seen, or in parallel or combinations of series and parallel arrangements. In some embodiments, the MEMS resonator may be modeled as the series connection of a resistor, inductor and capacitor, but these elements may not be physically present. The resistor $R_x$, inductor $L_x$ and capacitor $C_x$ may be coupled with parasitic capacitance elements $C_o$, which may resemble a capacitance between the resonator circuitry 202 and ground (e.g., a substrate of the die). The resonator circuitry 202 may provide an electrical model for any MEMS resonator such as, for example, clamped beam or any other resonator transducer to convert electrical energy into mechanical energy and/or vice versa. For example, electrical energy of the resonator circuitry 202 may cause a resonator plate or beam (hereinafter "resonator plate") to oscillate at a natural or resonant frequency defined by physical dimensions of the resonator plate as well as the electrode configuration. Values of these equivalent components (e.g., resistor Rx, inductor Lx and capacitor Cx) may be depend on mode of operation and temperature at the mode of operation.

The resonator circuitry 202 may be coupled with a transimpedance amplifier 205 in a positive feedback configuration, as can be seen. The positive feedback may excite and sustain an oscillation in the MEMS resonator with a frequency equal to a resonance frequency of the MEMS resonator. The resonance frequency of the resonator plate may change with temperature of the die 101, which may allow tracking of the temperature of the die 101 by monitoring an output frequency (e.g., Output of output module 207 in FIG. 2) of the oscillator set by the MEMS resonator.

In some embodiments, the self-calibrating thermal sensor 200 may include an output module 207 configured to output information about a frequency of the oscillator, which is set by the resonance frequency of the MEMS resonator. For example, the oscillating MEMS resonator may generate an electrical sinusoidal signal that corresponds with the resonant frequency of the resonator circuitry 202. The electrical sinusoidal signal may be output by the output module to the thermal calibration module 206. In some embodiments, the thermal calibration module 206 or output module 207 may include a frequency counter circuit or logic to count the frequency of the electrical sinusoidal signal.

The feedback circuitry 204 may further include a resistor Rf and buffer 209 coupled with the transimpedance amplifier 205, as can be seen. The resistor Rf may be configured to set a gain of the transimpedance amplifier 205 and the buffer 209 may be configured to isolate components of the feedback circuitry 204 such as, for example, the transimpedance amplifier 205. An automatic level control (ALC) module 208 may be configured to provide a stable level of gain for the oscillation of the MEMS resonator. For example, the ALC module 208 may include logic configured to control the resistor Rf to set the gain of the transimpedance amplifier 205.

The thermal calibration module 206 may be operatively coupled with the feedback circuitry 204. For example, the thermal calibration module 206 may be coupled with the output module 207 to receive the frequency of the MEMS resonator that is output by the output module 207. In some embodiments, the thermal calibration module 206 may be coupled with the resonator circuitry 202. For example, the thermal calibration module 206 may be configured to control oscillation of the resonator plate by biasing the resonator plate to operate in multiple modes such as a first mode and a second mode and/or to switch between the first mode and the second mode. Individual modes of the multiple modes may each excite oscillation that results in different displacement geometry and amplitude of the MEMS resonator relative to each other.

The thermal calibration module 206 may be configured to perform calculations using thermal response curve equations (e.g., equations (1) or (3)) to perform soft trim or thermal calibration of the self-calibrating thermal sensor 200. The thermal calibration module 206 may include a state machine configured to perform the method 600 of FIG. 6. For example, the thermal calibration module 206 may include soft trim algorithm logic that can be stored in firmware or other suitable storage medium and may be executed by a processor such as, for example a central processing unit (CPU) or microcontroller.

In some embodiments, the thermal calibration module 206 may be disposed on the die 101. For example, the thermal calibration module 206 may include circuitry formed on the die 101 such as, for example, memory configured to store instructions that, when executed by a processor, result in actions associated with thermal calibration as described herein. In other embodiments, the thermal calibration module 206 may not be disposed on the die 101, but may be part of another electrical device (e.g., another die or circuit board) that is operatively coupled with the feedback circuitry 204 and/or the resonator circuitry 202.

In some embodiments, the thermal calibration module 206 may be part of a power control unit (PCU) 211 disposed on the die. The PCU 211 may be coupled with the output module 207 and/or the thermal calibration module 206 and may be configured to manage power of the die 101 based on the information about frequency received from the output module 207 and/or the thermal calibration module 206. In some embodiments, the thermal calibration module 206 may provide oscillator frequency and/or calibration coefficients associated with calculations of the thermal response curve for the first mode and the second mode to the PCU 211 and/or a temperature calculation based the oscillator frequency and/or calibration coefficients. The PCU 211 may, for example, be configured to control operation of a thermal cooling system of the die 101 or may increase an operating frequency of transistors of the die 101 based on the frequency and/or calculated corresponding temperature of the resonator plate. In some embodiments, the PCU 211 may include circuitry formed on the die 101. The thermal calibration module 206 and the PCU 211 may be separate logic on the same die 101, but operatively coupled together in some embodiments. In other embodiments, the PCU 211 may be part of another electrical device (e.g., a circuit board such as motherboard 702 of FIG. 7) that is operatively coupled with the die 101 and the self-calibrating thermal sensor 200 on the die 101.

Figure 3:
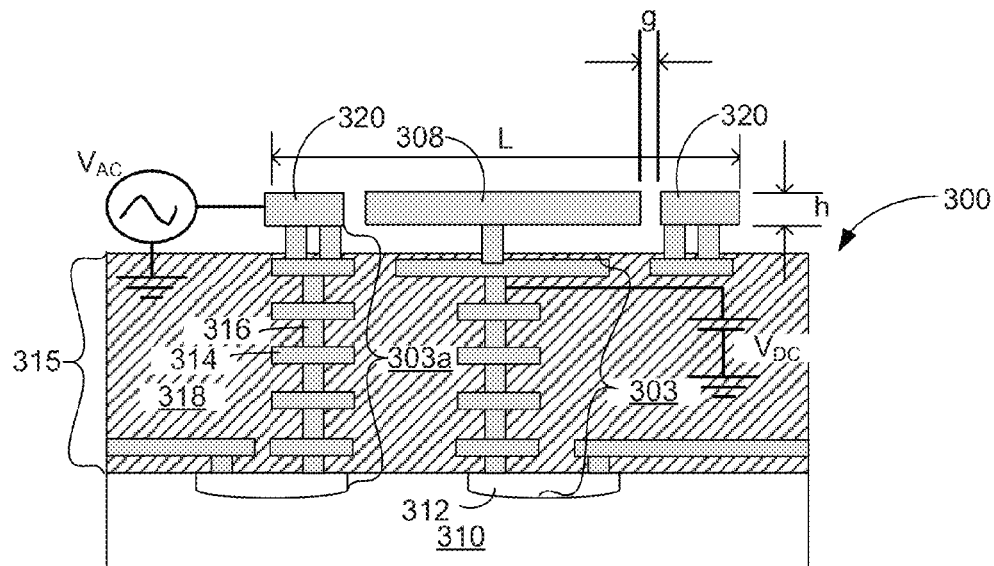
FIG. 3 schematically illustrates a cross-section side view of an integrated circuit (IC) die including a multi-mode resonator, in accordance with some embodiments.

FIG. 3 schematically illustrates a cross-section side view of an integrated circuit (IC) die (hereinafter "die 300") including a multi-mode resonator, in accordance with some embodiments. The multi-mode resonator may include a resonating element such as, for example, a resonator plate 308 and associated circuitry (e.g., circuitry 303) configured to thermally couple the resonator plate 308 with heat-generating circuitry (e.g., transistor 312). The multi-mode resonator may further include one or more actuation electrodes 320 and associated circuitry (e.g., circuitry 303) configured to activate oscillation of the resonator plate 308 and/or bias the resonator plate 308 to provide a first mode and second mode of oscillation.

The die 300 may include a substrate 310 composed of a semiconductor material (e.g., silicon). Circuitry 303 may be formed on the substrate 310 and may include, for example, transistors (e.g., transistor 312) that may generate heat when in operation and interconnect structures such as, for example, one or more trenches (e.g., trench 314) and/or via structures (e.g., via 316) that thermally couple the transistors with a resonator plate 308 to provide a thermal pathway between the transistors and the resonator plate 308. The resonator plate 308 may be disposed on an active side of the die 300. The interconnect structures (e.g., trench 314 or via 316) may be disposed in an electrically insulative material 318 such as, for example, silicon oxide that is disposed on the substrate 310. In some embodiments, the interconnect structures and the electrically insulative material 318 may be part of an interconnect layer 315 configured to route electrical signals to or from the transistors. The interconnect layer 315 may be disposed on the transistors (e.g., transistor 312). The interconnect structures and the resonator plate 308 may be composed of a thermally conductive material such as a metal (e.g., copper).

The die 300 may further include circuitry configured to activate oscillation of the resonator plate 308. For example, circuitry 303a may include an actuation electrode 320 disposed adjacent to the resonator plate 308, as can be seen, and configured to active oscillation of the resonator. The actuation electrode 320 may be electrically coupled with a direct current (DC) voltage source (e.g., $V_{DC}$) and the resonator plate 308 may be electrically coupled (e.g., capacitively and/or inductively coupled) with an alternating current (AC) voltage source (e.g., $V_{AC}$). The AC voltage and/or the DC voltage may be used to bias the resonator plate 308 to provide multiple modes of operation for the resonator plate 308.

In some embodiments, the resonator plate 308 may have a length, L, from 10 to 60 microns, and a height, h, from 1 to 4 microns. In some embodiments, the resonator plate 308 and the actuation electrode 320 may be separated by a gap, G, from 20 to 100 nm. Other suitable values for L, h and g may be used in other embodiments.

Figure 4:
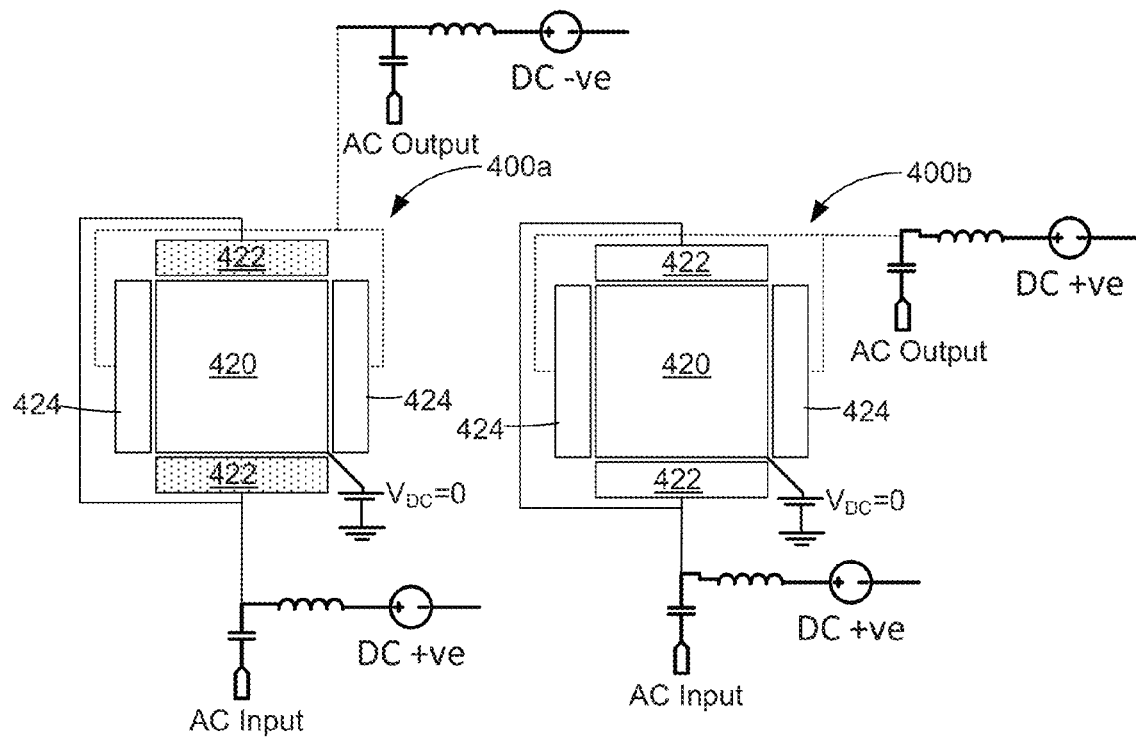
FIG. 4 schematically illustrates a multi-mode resonator configured in a first mode and a second mode, in accordance with some embodiments.

FIG. 4 schematically illustrates a multi-mode resonator (hereinafter "resonator") configured in a first mode 400a and a second mode 400b, in accordance with some embodiments. FIG. 4 may depict a same resonator configured to operate in the first mode 400a and the second mode 400b. In some embodiments, the components of the resonator may be further configured to operate in a third or more modes (not shown). The resonator may be part of a die (e.g., die 300 of FIG. 3) in some embodiments.

The resonator in the first mode 400a may be associated with a different and specific thermal sensitivity relative to the operation in the second mode 400b. In other words, a variation of oscillation frequency of the resonator due to temperature may be different for each mode. This property may be exploited to perform self-calibration of a thermal sensor (e.g., self-calibrating thermal sensor 200 of FIGS. 1-2).

According to various embodiments, the first mode 400a may represent a lame mode or square resonator lame mode (LA) and the second mode 400b may represent an extensional mode or square resonator extensional (SE) mode. The first mode 400a and the second mode 400b may be activated by biasing electrodes to capacitively excite a resonator plate 420 of the resonator. For example, in the first mode 400a, electrodes 422 and 424 may represent axis symmetric electrodes or opposing electrodes that are biased out-of-phase (e.g., opposite polarity) relative to one another. In the depicted first mode 400a configuration, the electrodes 422 are coupled with an AC input and the electrodes 424 are coupled with an AC output and the resonator plate 420 is coupled with DC ground (e.g., $V_{DC}$). The electrical connections may be switched to provide similar results in some embodiments. The electrodes 422 are biased with a DC voltage that is negative (e.g., DC −ve) in the first mode.

In the depicted second mode 400b, the electrodes 422 and 424 may be biased in-phase (e.g., same polarity) relative to one another. The electrodes 422 are biased with a DC voltage that is positive (e.g., DC +ve) in the first mode. Switching between the first mode 400a and the second mode 400b may be accomplished by changing a polarity of the DC bias (e.g., changing DC voltage from −ve to +ve).

The electrodes 422 in the depiction of the first mode 400a configuration have different marking than the electrodes 422 in the depiction of the second mode 400b configuration to indicate the opposite polarity of the DC bias applied to the electrodes 422 in the respective configurations. In other embodiments, other suitable electrode configurations may be used to bias the resonator plate to provide multiple modes of oscillation. For example, in other configurations, electrodes having opposite polarity may be staggered or interleaved relative to one another and may be disposed around the resonator plate 420. Such interleaved electrodes may be biased in-phase or out-of-phase to provide the respective first mode and the second mode.

The resonator plate 420 may have a variety of shapes according to various embodiments. In some embodiments, the resonator plate 420 may have a polygon shape including, for example, a rectangular shape such as a square. In other embodiments, the resonator plate 308 may have a non-linear shape such as, for example, a circular shape or combinations of polygon and curved shapes or may include an annular ring with a set of electrodes disposed on the inside of the ring. The resonator plate 420 may comport with embodiments described in connection with resonator plate 308 of FIG. 3 and vice versa.

Figure 5:
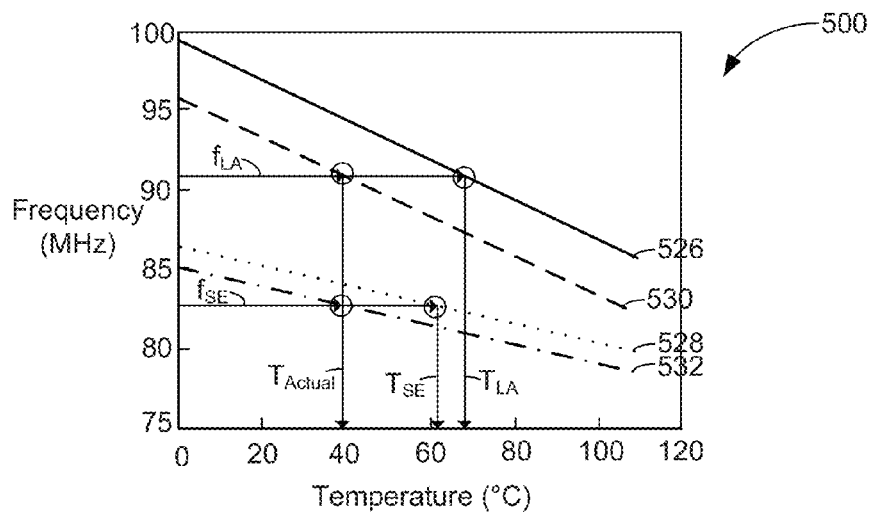
FIG. 5 is a graph depicting a correlation of measured frequency and temperature for a first mode and second mode of resonance, in accordance with some embodiments.

FIG. 5 is a graph 500 depicting a correlation of measured frequency and temperature for a first mode (e.g., first mode 400a of FIG. 4) and second mode (e.g., second mode 400b of FIG. 4) of resonance, in accordance with some embodiments. A thermal response of the resonator in the first mode and the second mode may be initially characterized in a laboratory setting to provide a characterized thermal curve for each of the first mode and the second mode (e.g., for a particular product embodied in a die). For example, a frequency of one or more resonators may be measured in the first mode and the second mode for a range of temperatures to provide a characterized thermal curve for each mode such as, for example, first ideal curve 526 and second ideal curve 528 respectively corresponding with the first mode (e.g., lame mode) and the second mode (extensional mode). Such curves (e.g., curves 526 and 528) may be used as a starting point to calibrate other thermal sensors in resonators manufactured according to a similar process (e.g., a same product as the particular product embodied in the die).

The first ideal curve 526 may be defined by a first equation (e.g., lame mode equation) according to the following, where $f_{Lame}$ represents the resonator frequency at temperature T, $f_{oLame}$ represents resonator frequency at a reference temperature $T_o$ (e.g., room temperature ~25° C. for cold embodiment and ~100° C. for hot embodiment), $\alpha_{Lame}$ represents a constant coefficient particular to a particular resonator design that is based on laboratory characterization of the resonator, T represents an unknown temperature to be calculated, $T_o$ represents the reference temperature, L represents a dimension (e.g., length L of FIG. 3) of a square resonator, E represents a Young's modulus of elasticity of material of the resonator (e.g., resonator plate 308 of FIG. 3), ρ represents a density of the material of the resonator and ν represents Poisson's ratio of the material of the resonator:

$$f_{Lame} = f_{oLame}(1 + \alpha_{Lame}(T - T_o)) \quad (1)$$
and
$$f_{oLame} = \frac{1}{L\sqrt{2}}\sqrt{\frac{E}{2\rho(1+v)}} \quad (2)$$

Equation (1) may be a first resonance mode equation representing a relation between a first mode resonance frequency and temperature. Other suitable equations may be used in other embodiments. Equation (2) may be modified according to well-known principles to provide $f_{oLame}$ for resonators having shapes other than a square.

The second ideal curve 528 may be defined by a second equation (e.g., extensional mode equation) according to the following where $f_{SE}$ represents the resonator frequency at temperature T, $f_{oSE}$ represents resonator frequency at a reference temperature $T_o$ (e.g., room temperature ~25° C. for cold embodiment and ~100° C. for hot embodiment), $\alpha_{Lame}$ represents a constant coefficient particular to a particular resonator design that is based on laboratory characterization of the resonator, T represents an unknown temperature to be calculated, $T_o$ represents the reference temperature, L represents a dimension (e.g., length L of FIG. 3) of a square resonator, E represents a Young's modulus of elasticity of material of the resonator (e.g., resonator plate 308 of FIG. 3), ρ represents a density of the material of the resonator and ν represents Poisson's ratio of the material of the resonator:

$$f_{SE} = f_{oSE}(1 + \alpha_{SE}(T - T_o)) \quad (3)$$
and
$$f_{oSE} = \frac{1}{L}\sqrt{\frac{E}{4\rho}} \quad (4)$$

Equation (3) may be a second resonance mode equation representing a relation between a second mode resonance frequency and temperature. Other suitable equations may be used in other embodiments. Equation (4) may be modified according to well-known principles to provide $f_{oSE}$ for resonators having shapes other than a square.

The slopes and/or offsets of the first ideal curve 526 and the second ideal curve 528 may be different from one another in some embodiments. The terms $\alpha_{Lame}$ and $\alpha_{SE}$ may be independent from mode frequency and may be determined by characterization in a laboratory setting. For example, correspondence of temperature to frequency may be characterized for a statistically significant sample size (e.g., greater than 32 samples) of resonators having a same design (e.g., for a same product) to provide a thermal response curve for the first mode and second mode. The characterization process may be performed whenever there is any change to the manufacturing process. A sample that is statistically representative to the population may be measured in the lab where the temperature of the resonator is accurately set and controlled to generate the frequency-temperature curves (e.g., first ideal curve 526 and second ideal curve 528) for both modes per resonator and then the averaged coefficients for the frequency temperature curves may then be extracted.

In some embodiments, calibration may include bringing a temperature sensor to a known temperature, and measuring a frequency output of the sensor. The temperature of the sensor may be changed to another known value and another frequency measurement may be measured. The sensor may then be calibrated by drawing a line or curve (such as those shown in FIG. 5) through the measured points. The derived calibration values (e.g., slopes of the curves) may correspond with the constant coefficient (e.g., $\alpha_{Lame}$ or $\alpha_{SE}$ of equations (1) and (3)), which may be stored/fused/programmed where the PCU can use them to accurately convert the sensor output to temperature. This calibration approach could, in practice, be used for each die, however such calibration may be limited by the accuracy of the forced temperature, and may be expensive because of the need to force two different, precision temperatures for each die. The embodiments of the present disclosure may avoid these challenges by activating one oscillator to oscillate in two different modes that depend upon the same physical values in equations (1), (2), (3), and (4). Assuming that the temperature has not changed between the calibration measurements, one can determine the temperature offset that is needed to make all of the equations simultaneously valid.

First actual curve 530 represents an actual thermal response curve for a self-calibrating thermal sensor (e.g., a thermal sensor including a resonator that was not used to provide the characterized thermal curve) in the first mode and second actual curve 532 represents an actual thermal response curve for the self-calibrating thermal sensor in the second mode. In the absence of manufacturing process variations, a measured frequency for the first mode (e.g., $f_{LA}$) and a measured frequency for the second mode (e.g., $f_{SE}$) ideally corresponds to a same temperature (e.g., $T_{Actual}$). However, practically, process variations in fabricating the resonator may affect dimensions of the resonator (e.g., resonator plate 308 of FIG. 3), which in turn, may affect a resonance frequency of the resonator. As a result, the measured frequency for the first mode (e.g., $f_{LA}$) and the measured frequency for the second mode (e.g., $f_{SE}$) may correspond with different temperatures (e.g., $T_{LA}$ and $T_{SE}$) of the respective first ideal curve 526 and second ideal curve 528, as can be seen. This discrepancy between temperatures of the two modes is calibrated by the self-calibrating thermal sensor. The induced effects of process variation can be softly calibrated out because the same resonator and, thus, same geometry is used to excite the first mode and the second mode. For example, an iterative technique may be used to minimize a difference between the calculated temperatures (e.g., $T_{LA}$ and $T_{SE}$) of the respective first ideal curve 526 and second ideal curve 528 using equations (1) and (3) until the equations converge on a same temperature.

Figure 6:
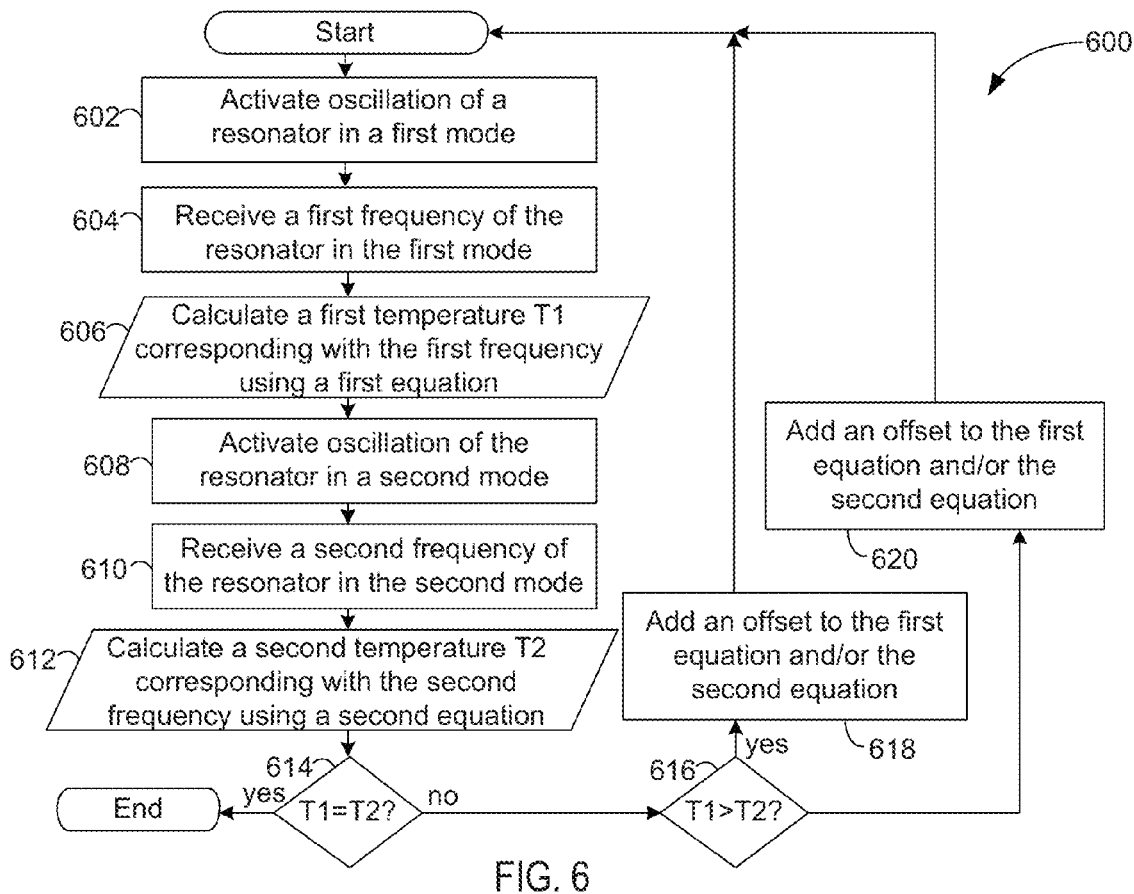
FIG. 6 is a flow diagram of a method of thermal calibration, in accordance with some embodiments.

FIG. 6 is a flow diagram of a method 600 of thermal calibration, in accordance with some embodiments. The actions of method 600 may be performed by a thermal calibration module (e.g., thermal calibration module 206 of FIG. 2) that is coupled to control and/or monitor oscillation of a resonator of a thermal sensor in a first mode and second mode. For example, the thermal calibration module may be configured to switch between the first mode and the second mode. The thermal calibration module may be further configured to perform calculations using thermal response curve equations (e.g., equations (1) or (3)) to perform soft trim or thermal calibration of the thermal sensor. The thermal calibration module may include a state machine configured to perform the method 600. For example, the actions of method 600 may represent soft trim algorithm logic that can be stored in firmware or other suitable storage medium and may be executed by a processor such as, for example, a central processing unit (CPU) or microcontroller.

At 602, the method 600 includes activating oscillation of a resonator in a first mode. A thermal calibration module may place the resonator in a first mode using out-of-phase biasing of electrodes disposed adjacent to a resonator plate (e.g., according to first mode 400a configuration of FIG. 4).

At 604, the method 600 includes receiving a first frequency of the resonator in the first mode. The first frequency corresponds with a resonant frequency of the resonator plate in the first mode. In the first mode, the resonator plate may oscillate at a resonant frequency (e.g., the first frequency) that is dependent on and, thus, tracks a temperature of the resonator plate. While in the first mode, the oscillating resonator plate may generate an electrical sinusoidal signal that corresponds with the first frequency and is output to the thermal calibration module.

At 606, the method 600 includes calculating a first temperature T1 corresponding with the first frequency using a first equation (e.g., equation (1)). The first temperature may be calculated, for example, using equation (1) where the frequency of the lame mode is the first frequency received at 604. The first temperature T1 may be calculated, for example, by rearranging equation (1) as shown in equation (5):

$$T1 = T = T_{Lame} = \left(T_o - \frac{1}{\alpha_{Lame}}\right) + \frac{1}{f_{oLame}\alpha_{Lame}} f_{Lame} \quad (5)$$

At 608, the method 600 includes activating oscillation of the resonator in a second mode. A thermal calibration module may place the resonator in a second mode using in-phase biasing of electrodes disposed adjacent to a resonator plate (e.g., according to second mode 400b configuration of FIG. 4).

At 610, the method 600 includes receiving a second frequency of the resonator in the second mode. The second frequency corresponds with a resonant frequency of the resonator plate in the second mode. In the second mode, the resonator plate may oscillate at a resonant frequency (e.g., the second frequency) that is dependent on and, thus, tracks a temperature of the resonator plate. While in the second mode, the oscillating resonator plate may generate an electrical sinusoidal signal that corresponds with the second frequency and is output to the thermal calibration module. In some embodiments, the thermal calibration module may include a frequency counter circuit or logic to count the frequency of the electrical sinusoidal signal.

At 612, the method 600 includes calculating a second temperature T2 corresponding with the second frequency using a second equation (e.g., equation (3)). The second temperature may be calculated, for example, using equation (1) where the frequency of the extensional mode is the second frequency received at 610. The second temperature T2 may be calculated, for example, by rearranging equation (3) as shown in equation (6):

$$T2 = T = T_{SE} = \left(T_o - \frac{1}{\alpha_{SE}}\right) + \frac{1}{f_{oSE}\alpha_{SE}} f_{SE} \quad (6)$$

At 614, the method 600 includes comparing the first temperature T1 and T2 to provide a result of the comparison for determining whether they are equal, or minimized, or less than a pre-determined threshold difference. If T1 and T2 are equal or minimized or less than the pre-determined threshold difference, then the method 600 may end. The offsets of the first equation and/or the second equation may be stored for future use by the thermal sensor in reading the temperature of heat-generating circuitry based on a frequency of the resonator in the first mode and/or second mode.

If T1 and T2 are not equal or not minimized or not less than the pre-determined threshold difference, then the method 600 may proceed to 616 where it is determined whether T1 is greater than T2. If T1 is greater than T2, then at 618, an offset is added to the first equation and/or the second equation. If T2 is greater than T1, then at 620, an offset is added to the first equation and/or the second equation. In some embodiments, an offset is added to both the first equation and the second equation at 618 or 620. The offset added at 618 may have an opposite sign relative to the offset added at 620. For example, in some embodiments, a positive offset may be added at 618 and a negative offset may be added at 620. The offset added at 618 and 620 may have a same magnitude, but opposite sign in some embodiments. After adding the offset to the first and second equations at 618 or 620, the method 600 may repeat again (e.g., actions at 602-614 are performed again). In some embodiments, the thermal calibration module may be configured to iteratively perform one or more actions of method 600 (e.g., actions 602-620) until the comparison of T1 and T2 at 614 is satisfied.

Actions of method 600 may be performed during various times. For example, the thermal calibration module (e.g., logic) may be configured to perform actions of method 600 during class or assembly test of an IC die to provide an initial thermal calibration. The thermal calibration module may perform actions of method 600 subsequent to shipping of the IC die to a customer. For example, the thermal calibration module may perform the actions of method 600 during boot time or real-time operation of the IC die or on a periodic basis while the IC die is embodied in a computing device in possession by an end user of the IC die. An ability to perform thermal calibration in the field may mitigate age-induced effects and maintain accuracy of a thermal sensor over a lifetime of a system (e.g., computing device) that includes the thermal sensor and thermal calibration module. In some embodiments, accuracy within +/−1° C. may be achieved using thermal calibration techniques described herein.

Various operations are described as multiple discrete operations in turn, in a manner that is most helpful in understanding the claimed subject matter. However, the order of description should not be construed as to imply that these operations are necessarily order dependent. For example, actions of the method 600 may be performed in another suitable order than depicted. In some embodiments, activation of oscillation in the second mode at 608 may be performed prior to activation of oscillation in the first mode at 602 and/or calculations performed at 606 and 612 may be performed subsequent to receiving the first frequency and the second frequency at 604 and 610. Other suitable modes other than the modes described in connection with lame mode and extensional mode may be used in other embodiments.

Figure 7:
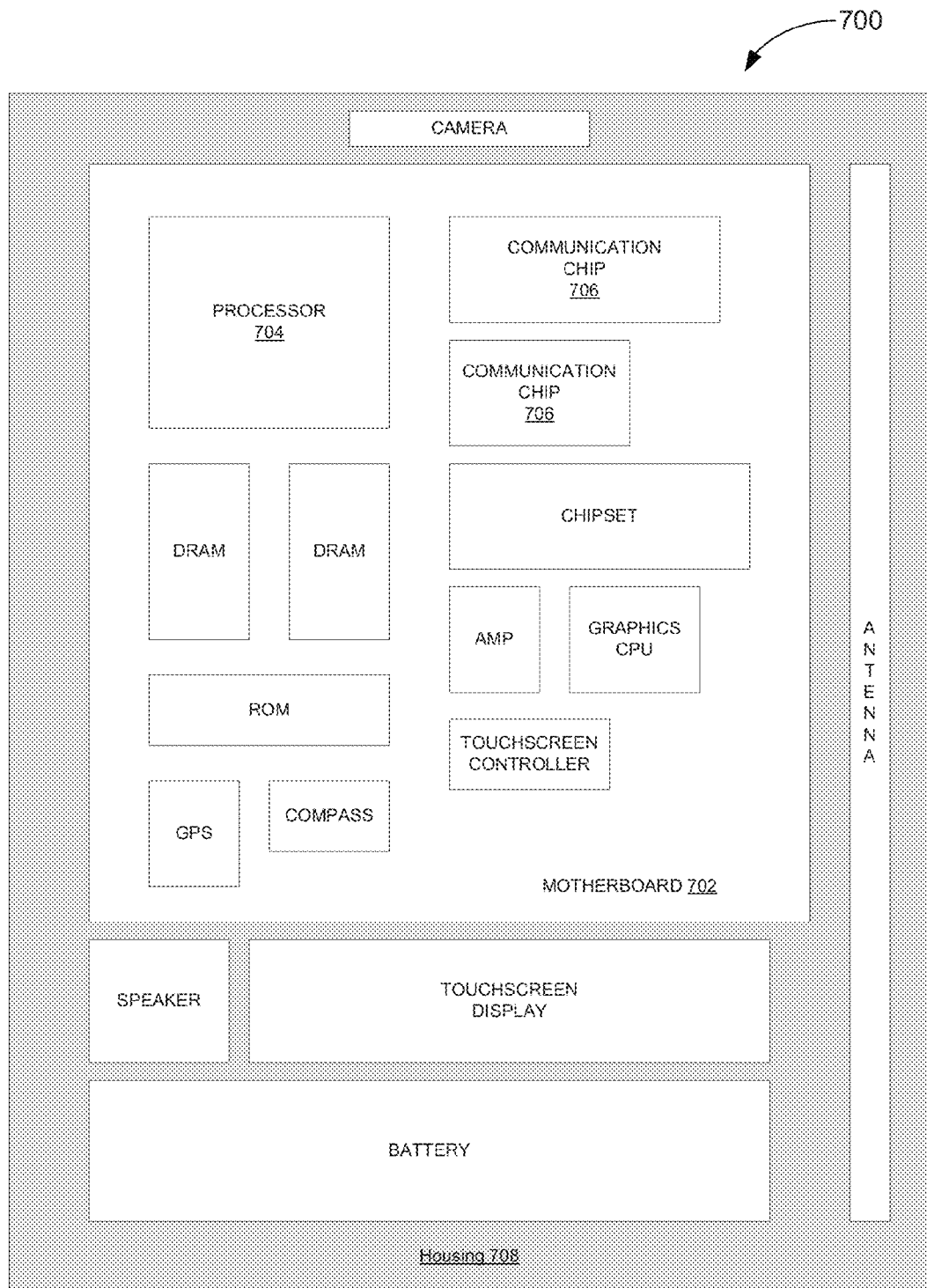
FIG. 7 schematically illustrates a computing device that includes an IC die having a self-calibrating thermal sensor and/or resonator as described herein, in accordance with some embodiments.

Embodiments of the present disclosure may be implemented into a system using any suitable hardware and/or software to configure as desired. FIG. 7 schematically illustrates a computing device 700 that includes an IC die (e.g., die 101 of FIG. 1-2 or 300 of FIG. 3) having a self-calibrating thermal sensor (e.g., self-calibrating thermal sensor 200) and/or resonator (e.g., resonator described in connection with FIGS. 3 and 4) as described herein, in accordance with some embodiments. The computing device 700 may house a board such as motherboard 702. The motherboard 702 may include a number of components, including but not limited to a processor 704 and at least one communication chip 706. The processor 704 may be physically and electrically coupled to the motherboard 702. In some implementations, the at least one communication chip 706 may also be physically and electrically coupled to the motherboard 702. In further implementations, the communication chip 706 may be part of the processor 704.

Depending on its applications, computing device 700 may include other components that may or may not be physically and electrically coupled to the motherboard 702. These other components may include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, a Geiger counter, an accelerometer, a gyroscope, a speaker, a camera, and a mass storage device (such as hard disk drive, compact disk (CD), digital versatile disk (DVD), and so forth). Housing 708 may protect internal components from environmental hazards and/or handling.

The communication chip 706 may enable wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards. The communication chip 706 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 706 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 706 may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication chip 706 may operate in accordance with other wireless protocols in other embodiments.

The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

The processor 704 of the computing device 700 may include an IC die (e.g., die 101 of FIG. 1-2 or 300 of FIG. 3) having a self-calibrating thermal sensor (e.g., self-calibrating thermal sensor 200) as described herein. For example, the processor 704 may include an IC die mounted on the motherboard 702. The term "processor" may refer to any device or portion of a device that processes electronic data from registers and/or memory to transform that electronic data into other electronic data that may be stored in registers and/or memory.

The communication chip 706 may also include an IC die (e.g., die 101 of FIG. 1-2 or 300 of FIG. 3) having a self-calibrating thermal sensor (e.g., self-calibrating thermal sensor 200) as described herein. In further implementations, another component (e.g., memory device or other integrated circuit device) housed within the computing device 700 may include an IC die (e.g., die 101 of FIG. 1-2 or 300 of FIG. 3) having a self-calibrating thermal sensor (e.g., self-calibrating thermal sensor 200) as described herein. In one embodiment, the processor 704 may include the IC die having the thermal sensor (e.g., resonating plate) and the thermal calibration module may include instructions stored in memory that is coupled with the thermal sensor of the processor.

In some embodiments, the thermal calibration module (e.g., thermal calibration module 206) and the thermal sensor (e.g., self-calibrating thermal sensor 200) are components of a same computing device. For example, the thermal calibration module and the thermal sensor may be disposed on a same IC die, within a same package substrate including the IC die, or coupled with a same circuit board (e.g., motherboard 702) or disposed within a same housing 708. In various implementations, the computing device 700 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 700 may be any other electronic device that processes data.

EXAMPLES

The following paragraphs provide a number of examples of embodiments of the present disclosure.

Example 1A is a self-calibrating thermal sensing device including a resonator configured to oscillate at a frequency corresponding with a temperature of circuitry of an integrated circuit (IC) die, wherein the resonator is thermally coupled with the circuitry and configured to operate in a first mode and a second mode and logic operatively coupled with the resonator, and configured to calculate a first temperature corresponding with a first frequency of the resonator in the first mode using a first equation, calculate a second temperature corresponding with a second frequency of the resonator in the second mode using a second equation, and add an offset to the first equation and the second equation based on a result of a comparison of the first temperature and the second temperature.

Example 1B is the device of Example 1A, wherein the logic is further configured to iteratively calculate the first temperature and the second temperature and add the offset to the first temperature and the second temperature until the first temperature and the second temperature are equal or until a difference between the first temperature and the second temperature is minimized or smaller than a predetermined threshold.

Example 1C is the device of Example 1A, wherein the logic is further configured to activate oscillation of the resonator in the first mode, receive the first frequency of the resonator in the first mode, activate oscillation of the resonator in the second mode, receive the second frequency of the resonator in the second mode, and compare the first temperature and the second temperature to provide the result of the comparison of the first temperature and the second temperature.

Example 1D is the device of any of Examples 1A-1C, wherein the resonator includes an equivalent circuit that includes a resistor, inductor and capacitor coupled with each other in series or parallel, or combinations thereof.

Example 1E is the device of any of Examples 1A-1C, further including an amplifier coupled with the resonator in a positive feedback configuration, wherein the amplifier is configured to excite oscillation of the resonator at a frequency corresponding with a resonant frequency of the resonator to provide the first frequency of the resonator in the first mode and the second frequency of the resonator in the second mode and an output module coupled with the resonator and configured to output information about the first frequency of the resonator in the first mode and the second frequency of the second mode.

Example 1F is the device of Example 1E, further including a power control unit (PCU) coupled with the output module, the PCU being configured to manage power of the IC die based on the information from the output module.

Example 1G is the device of any of Examples 1A-1C, wherein the first equation includes a lame mode equation and the second equation includes an extensional mode equation.

Example 2A is an integrated circuit (IC) die including circuitry configured to generate heat when in operation, a resonator thermally coupled with the circuitry and configured to oscillate at a frequency corresponding with a temperature of the circuitry, wherein the resonator is configured to operate in a first mode and a second mode and a thermal calibration module operatively coupled with the resonator, and configured to calculate a first temperature corresponding with a first frequency of the resonator in the first mode using a first equation, calculate a second temperature corresponding with a second frequency of the resonator in the second mode using a second equation, and add an offset to the first equation and the second equation based on a result of a comparison of the first temperature and the second temperature.

Example 2B is the IC die of Example 2A, further including an interconnect layer disposed on the circuitry and configured to route electrical signals to or from the circuitry, wherein the resonator is thermally coupled with the circuitry through the interconnect layer, the circuitry includes a transistor device disposed on an active side of the IC die and the resonator is disposed on the active side of the IC die.

Example 2C is the IC die of any of Examples 2A-2B, wherein the resonator comprises a copper plate coupled with electrodes, the first mode is activated by out-of-phase biasing of the electrodes and the second mode is activated by in-phase biasing of the electrodes.

Example 2D is the IC die of any of Examples 2A-2B, wherein the IC die includes a processor and the logic includes instructions stored in a storage medium of the processor.

Example 2E is the IC die of Example 2D, wherein the logic is configured to calculate the first temperature, calculate the second temperature and add the offset during boot time of the processor, real-time operation of the processor or on a periodic basis.

Example 2F is the IC die of Example 2E, wherein the logic is further configured to calculate the first temperature, calculate the second temperature and add the offset during class or assembly thermal calibration of the IC die.

Example 3A is a method for calibrating a thermal sensor, the method including receiving, by a thermal calibration module coupled with the thermal sensor, a first frequency of a resonator in a first mode, calculating, by the thermal calibration module, a first temperature corresponding with the first frequency of the resonator in the first mode using a first equation, receiving, by the thermal calibration module, a second frequency of the resonator in a second mode, calculating, by the thermal calibration module, a second temperature corresponding with the second frequency of the resonator in the second mode using a second equation and adding, by the thermal calibration module, an offset to the first equation and the second equation based on a result of a comparison of the first temperature and the second temperature.

Example 3B is the method of Example 3A, further including iteratively performing the receiving the first frequency of the resonator in the first mode, calculating the first temperature, receiving the second frequency of the resonator in the second mode, calculating the second temperature and adding the offset until the first temperature and the second temperature are equal or until a difference between the first temperature and the second temperature is minimized or smaller than a pre-determined threshold.

Example 3C is the method of Example 3A further including comparing, by the thermal calibration module, the first temperature and the second temperature to provide the result of the comparison of the first temperature and the second temperature.

Example 3D is the method of any of Examples 3A-3C, further including activating, by the thermal calibration module, oscillation of the resonator in the first mode and activating, by the thermal calibration module, oscillation of the resonator in the second mode.

Example 3E is the method of any of Examples 3A-3C, wherein the thermal calibration module and the thermal sensor are components of a same computing device.

Example 4A is a computing device including a circuit board, an integrated circuit (IC) die coupled with the circuit board, the IC die including circuitry configured to generate heat when in operation, a thermal sensor thermally coupled with the circuitry, the thermal sensor including a resonator that is configured to oscillate at a frequency corresponding with a temperature of the circuitry, wherein the resonator is configured to operate in a first mode and a second mode and a thermal calibration module operatively coupled with the thermal sensor, and configured to calculate a first temperature corresponding with a first frequency of the resonator in the first mode using a first equation, calculate a second temperature corresponding with a second frequency of the resonator in the second mode using a second equation, and add an offset to the first equation and the second equation based on a result of a comparison of the first temperature and the second temperature.

Example 4B is the computing device of Example 4A, wherein the IC die is a processor, the computing device further including memory coupled with the processor, wherein the thermal calibration module includes instructions stored in the memory.

Example 4C is the computing device of any of Examples 4A-4B, further including one or more of an antenna, a display, a touchscreen display, a touchscreen controller, a battery, an audio codec, a video codec, a power amplifier, a global positioning system (GPS) device, a compass, a Geiger counter, an accelerometer, a gyroscope, a speaker, or a camera coupled with the circuit board, wherein the computing device is one of a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder.

Example 5A is an apparatus including means for oscillating at a frequency corresponding with a temperature of an integrated circuit (IC) device, wherein the means is configured to operate in a first mode and a second mode and means for calculating a first temperature corresponding with a first frequency of the resonator in the first mode using a first equation, calculating a second temperature corresponding with a second frequency of the resonator in the second mode using a second equation, and adding an offset to the first equation and the second equation based on a result of a comparison of the first temperature and the second temperature.

Example 5B is the apparatus of Example 5A, further including means for iteratively calculating the first temperature and the second temperature and adding the offset to the first temperature and the second temperature until the first temperature and the second temperature are equal or until a difference between the first temperature and the second temperature is minimized or smaller than a pre-determined threshold.

Example 6A is a non-transitory computer-readable storage medium having instructions stored thereon that are configured to cause calibration of a thermal sensor, in response to execution by a processor, to receive a first frequency of a resonator in a first mode, calculate a first temperature corresponding with the first frequency of the resonator in the first mode using a first equation, receive a second frequency of the resonator in a second mode, calculate a second temperature corresponding with the second frequency of the resonator in the second mode using a second equation, and add an offset to the first equation and the second equation based on a result of a comparison of the first temperature and the second temperature.

Example 6B is the non-transitory computer-readable storage medium of Example 6A, wherein the instructions are further configured, in response to execution by the processor, to activate oscillation of the resonator in the first mode and activate oscillation of the resonator in the second mode.

Example 7A is a method of fabricating a self-calibrating thermal sensing device, the method comprising forming circuitry on a semiconductor substrate, the circuitry being configured to generate heat when in operation, forming an interconnect layer including electrical interconnect structures configured to route electrical signals to or from the circuitry, forming, simultaneously with forming the interconnect layer, thermal interconnect structures configured to route the heat generated by the circuitry, when in operation, through the interconnect layer, forming a resonator on the interconnect layer, the resonator being configured to oscillate at a frequency corresponding with a temperature of the circuitry, wherein the resonator is configured to operate in a first mode and a second mode and coupling a thermal calibration module with the resonator, the thermal calibration module being configured to calculate a first temperature corresponding with a first frequency of the resonator in the first mode using a first equation, calculate a second temperature corresponding with a second frequency of the resonator in the second mode using a second equation, and add an offset to the first equation and the second equation based on a result of a comparison of the first temperature and the second temperature.

Example 7B is the method of Example 7A, wherein forming the resonator comprises forming a copper plate coupled with electrodes, wherein the first mode is activated by the thermal calibration module by out-of-phase biasing of the electrodes and the second mode is activated by the thermal calibration module by in-phase biasing of the electrodes.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

The invention claimed is:

1. A self-calibrating thermal sensing device, the device comprising:
   a resonator to oscillate at a frequency corresponding with a temperature of circuitry of an integrated circuit (IC) die, wherein the resonator is disposed on an active side of the die, and thermally coupled with the circuitry to operate in a first mode and a second mode;
   an actuation electrode disposed on the die to activate oscillation of the resonator to provide the first mode and the second mode oscillation; and
   logic disposed on the die and operatively coupled with the resonator, to
      calculate a first temperature of the die corresponding with a first frequency of the resonator in the first mode using a first equation,
      calculate a second temperature of the die corresponding with a second frequency of the resonator in the second mode using a second equation, and
      add an offset to the first equation and the second equation based on a result of a comparison of the first temperature and the second temperature.

2. The device of claim 1, wherein the logic is to further iteratively calculate the first temperature and the second temperature and add the offset to the first temperature and the second temperature until the first temperature and the second temperature are equal or until a difference between the first temperature and the second temperature is minimized or smaller than a pre-determined threshold.

3. The device of claim 1, wherein the logic is to further activate oscillation of the resonator in the first mode, receive the first frequency of the resonator in the first mode, activate oscillation of the resonator in the second mode, receive the second frequency of the resonator in the second mode, and compare the first temperature and the second temperature to provide the result of the comparison of the first temperature and the second temperature.

4. The device of claim 1, wherein the resonator includes an equivalent circuit that includes a resistor, inductor and capacitor coupled with each other in series or parallel, or combinations thereof.

5. The device of claim 1, further comprising:
   an amplifier coupled with the resonator in a positive feedback configuration, wherein the amplifier is to excite oscillation of the resonator at a frequency corresponding with a resonant frequency of the resonator to provide the first frequency of the resonator in the first mode and the second frequency of the resonator in the second mode; and
   an output module coupled with the resonator to output information about the first frequency of the resonator in the first mode and the second frequency of the second mode.

6. The device of claim 5, further comprising:
   a power control unit (PCU) coupled with the output module, the PCU to manage power of the IC die based on the information from the output module.

7. The device of claim 1, wherein:
   the first equation includes a lame mode equation; and
   the second equation includes an extensional mode equation.

8. An integrated circuit (IC) die comprising:
   circuitry that generates heat when in operation;
   a resonator thermally coupled with the circuitry to oscillate at a frequency corresponding with a temperature of the circuitry, wherein the resonator is to operate in a first mode and a second mode;
   an actuation electrode disposed on the die to activate oscillation of the resonator to provide the first mode and the second mode oscillation; and
   logic disposed on the die and operatively coupled with the resonator, to
      calculate a first temperature of the circuitry corresponding with a first frequency of the resonator in the first mode using a first equation,
      calculate a second temperature of the circuitry corresponding with a second frequency of the resonator in the second mode using a second equation, and
      add an offset to the first equation and the second equation based on a result of a comparison of the first temperature and the second temperature.

9. The IC die of claim 8, further comprising:
   an interconnect layer disposed on the circuitry to route electrical signals to or from the circuitry, wherein the resonator is thermally coupled with the circuitry through the interconnect layer, the circuitry includes a transistor device disposed on an active side of the IC die and the resonator is disposed on the active side of the IC die.

10. The IC die of claim 8, wherein:
    the resonator comprises a copper plate coupled with electrodes;
    the first mode is activated by out-of-phase biasing of the electrodes; and
    the second mode is activated by in-phase biasing of the electrodes.

11. The IC die of claim 8, wherein:
the IC die includes a processor; and
the logic includes instructions stored in a storage medium of the processor.

12. The IC die of claim 11, wherein the logic is to calculate the first temperature, calculate the second temperature and add the offset during boot time of the processor, real-time operation of the processor or on a periodic basis.

13. The IC die of claim 12, wherein the logic is to calculate the first temperature, calculate the second temperature and add the offset during class or assembly thermal calibration of the IC die.

14. A method for calibrating a thermal sensor, the method comprising:
activating, by an actuation electrode disposed on a die, oscillation of a resonator to provide a first mode oscillation wherein the resonator is disposed on an active side of the die;
receiving, by a thermal calibration module coupled with the thermal sensor, a first frequency of the resonator in the first mode;
calculating, by the thermal calibration module, a first temperature of the die corresponding with the first frequency of the resonator in the first mode using a first equation;
activating, by the actuation electrode, oscillation of the resonator to provide a second mode oscillation;
receiving, by the thermal calibration module, a second frequency of the resonator in the second mode;
calculating, by the thermal calibration module, a second temperature of the die corresponding with the second frequency of the resonator in the second mode using a second equation; and
adding, by the thermal calibration module, an offset to the first equation and the second equation based on a result of a comparison of the first temperature and the second temperature.

15. The method of claim 14, further comprising:
iteratively performing the receiving the first frequency of the resonator in the first mode, calculating the first temperature, receiving the second frequency of the resonator in the second mode, calculating the second temperature and adding the offset until the first temperature and the second temperature are equal or until a difference between the first temperature and the second temperature is minimized or smaller than a pre-determined threshold.

16. The method of claim 14, further comprising:
comparing, by the thermal calibration module, the first temperature and the second temperature to provide the result of the comparison of the first temperature and the second temperature.

17. The method of claim 14, wherein the thermal calibration module and the thermal sensor are components of a same computing device.

18. A computing device comprising:
a circuit board;
an integrated circuit (IC) die coupled with the circuit board, the IC die including:
circuitry to generate heat when in operation;
a thermal sensor thermally coupled with the circuitry, the thermal sensor including a resonator to oscillate at a frequency corresponding with a temperature of the circuitry, wherein the resonator is disposed on an active side of the die, to operate in a first mode and a second mode;
an actuation electrode disposed on the die to activate oscillation of the resonator to provide the first mode and the second mode oscillation; and
a thermal calibration module operatively coupled with the thermal sensor, to
calculate a first temperature of the die corresponding with a first frequency of the resonator in the first mode using a first equation,
calculate a second temperature of the die corresponding with a second frequency of the resonator in the second mode using a second equation, and
add an offset to the first equation and the second equation based on a result of a comparison of the first temperature and the second temperature.

19. The computing device of claim 18 wherein the IC die is a processor, the computing device further comprising:
memory coupled with the processor, wherein the thermal calibration module includes instructions stored in the memory.

20. The computing device of claim 19, further comprising:
one or more of an antenna, a display, a touchscreen display, a touchscreen controller, a battery, an audio codec, a video codec, a power amplifier, a global positioning system (GPS) device, a compass, a Geiger counter, an accelerometer, a gyroscope, a speaker, or a camera coupled with the circuit board,
wherein the computing device is one of a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder.

* * * * *